(12) United States Patent
Chen et al.

(10) Patent No.: US 11,975,705 B1
(45) Date of Patent: May 7, 2024

(54) SELF-ADAPTIVE GUIDED ADVANCED DRIVER ASSISTANCE SYSTEM CONSIDERING DRIVING SKILL DIFFERENCE BETWEEN DRIVERS

(71) Applicant: TONGJI UNIVERSITY, Shanghai (CN)

(72) Inventors: Hong Chen, Shanghai (CN); Lin Zhang, Shanghai (CN); Qiang Meng, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/518,356

(22) Filed: Nov. 22, 2023

(30) Foreign Application Priority Data

Nov. 25, 2022 (CN) .......................... 202211493675.5

(51) Int. Cl.
*B60W 10/20* (2006.01)
*B60W 40/09* (2012.01)
*B60W 50/00* (2006.01)
*B60W 60/00* (2020.01)

(52) U.S. Cl.
CPC ............ *B60W 10/20* (2013.01); *B60W 40/09* (2013.01); *B60W 50/0098* (2013.01); *B60W 60/0015* (2020.02); *B60W 2050/0031* (2013.01); *B60W 2510/202* (2013.01)

(58) Field of Classification Search
CPC .. B60W 10/20; B60W 40/09; B60W 50/0098; B60W 60/0015; B60W 2050/0031; B60W 2510/202
See application file for complete search history.

(56) References Cited

U.S. PATENT DOCUMENTS

| | | | |
|---|---|---|---|
| 2006/0190158 A1* | 8/2006 | Shiiba ................ | B60K 31/0066 701/70 |
| 2010/0209888 A1* | 8/2010 | Huang ................ | G09B 19/167 434/66 |
| 2010/0211270 A1* | 8/2010 | Chin ...................... | B62D 6/007 701/44 |
| 2018/0208206 A1* | 7/2018 | Petrucci ................ | B60W 30/02 |

* cited by examiner

*Primary Examiner* — Jason Holloway
(74) *Attorney, Agent, or Firm* — Bochner PLLC; Andrew D. Bochner (57) ABSTRACT

The present disclosure relates to a self-adaptive guided advanced driver assistance system (ADAS) considering a driving skill difference between drivers, including a driving skill classification module, configured to calculate a vehicle stability margin based on a vehicle state, and obtain a corresponding driving skill classification result with the vehicle stability margin and a driver state as inputs of a driving skill classification model; a skill learning range classification module, configured to obtain the vehicle stability margin and a distance between a vehicle and a lane line boundary, and use a skill learning range classification model to obtain a skill learning range classification result; and a self-adaptive guided driving right allocation module, configured to realize driving right allocation control based on the driving skill classification result and the skill learning range classification result, and generate an assisted steering torque acting on a vehicle steering system.

10 Claims, 3 Drawing Sheets

SELF-ADAPTIVE GUIDED ADVANCED DRIVER ASSISTANCE SYSTEM CONSIDERING DRIVING SKILL DIFFERENCE BETWEEN DRIVERS

CROSS REFERENCE TO RELATED APPLICATION

This patent application claims the benefit and priority of Chinese Patent Application No. 202211493675.5, filed with the China National Intellectual Property Administration on Nov. 25, 2022, the disclosure of which is incorporated by reference herein in its entirety as part of the present application.

TECHNICAL FIELD

The present disclosure relates to an advanced driver assistance system (ADAS), and in particular, to a self-adaptive guided ADAS considering a driving skill difference between drivers.

BACKGROUND

An advanced driver assistance system (ADAS) is one of the main means to reduce traffic accidents, and thus research on ADASs has attracted the attention of the automobile industry and the Internet industry. In A survey of personalization for advanced driver assistance systems, it is pointed out that standardized assisted driving may cause discomfort to a driver, which makes the driver unwilling to turn on an ADAS. In order to improve utilization of an ADAS, a personalized ADAS is studied, and the allocation of driving rights is a main research point.

In the patent No. CN 107804315 B, the allocation of driving rights is determined by using a difference between a determined desired front wheel angle and an actual front wheel angle, that is, a greater difference indicates a large distance by which a vehicle deviates from a safe area, and control permissions of a machine should be increased. However, differences between drivers' driving skills and driving styles are not considered, which may lead to frequent conflicts between drivers and an ADAS. On this basis, a lateral driving right allocation method for human-machine co-driving considering a driver's driving skills is proposed in the patent No. CN 108819951B, and the driving skills are reflected by a number of times of exceeding a lane line and a braking intensity. However, this ignores the driver's state. During normal driving of a vehicle on a road, a novice driver often cannot find an emergency situation in time due to nervousness. In Changes in collision rates among novice drivers during the first months of driving, it is also pointed out that an accident probability of novice drivers is greatly reduced in the first six months after obtaining of a driver's license compared with that in two years later. Therefore, an ADAS based on visual guidance is proposed in the patent No. CN 113989775 B, aiming to reduce a burden on novice drivers and improve the drivers' concentration through visual guidance. At the same starting point, the patent No. CN 114771574 A proposes a method of online allocation of driving rights based on a driver's neuromuscular state, aiming to solve driving errors caused by the driver's nervousness.

In the above existing patent technologies, major research has been made on personalized assisted driving technologies, which all start from assisting novice drivers, which leads to the drivers' dependence on ADASs. Since the ADAS cannot cover all working conditions, a novice driver who relies too much on the ADAS cannot be competent for the dangerous working conditions when the driver needs to take over.

SUMMARY

An objective of the present disclosure is to provide a self-adaptive guided ADAS considering a driving skill difference between drivers to overcome the above shortcomings existing in the prior art, which improves the driving skills as soon as possible under safe conditions.

The objective of the present disclosure can be achieved by the following technical solution.

A self-adaptive guided ADAS considering a driving skill difference between drivers includes:

a driving skill classification module, configured to obtain a vehicle state and a driver state, calculate a vehicle stability margin based on the vehicle state, and obtain a corresponding driving skill classification result with the vehicle stability margin and the driver state as inputs of a driving skill classification model, where the vehicle stability margin is calculated based on a vehicle stability boundary determined off-line;

a skill learning range classification module, configured to obtain the vehicle stability margin and a distance between a vehicle and a lane line boundary, and use a skill learning range classification model to obtain a skill learning range classification result; and a self-adaptive guided driving right allocation module, configured to realize driving right allocation control based on the driving skill classification result and the skill learning range classification result, and generate an assisted steering torque acting on a vehicle steering system.

Further, a process for determining the vehicle stability boundary specifically includes:

constructing a vehicle dynamics model;

obtaining a root locus graph of a vehicle state change based on the vehicle dynamics model; and performing classified training on state points in the root locus graph by a support vector machine to obtain a classification hyperplane, where the classification hyperplane is used as the vehicle stability boundary.

Further, the vehicle dynamics model is a two-degree-of-freedom vehicle model and a Dugoff tire model.

Further, each group of states is iterated by using a third-order Runge-Kutta formula to obtain the root locus graph.

Further, the skill learning range classification model is expressed as:

$$C_s = \begin{cases} 1; & \dfrac{\min(D_{sl}, D_{sh})}{(D_{sl}+D_{sh})} \geq 0.25 \text{ and } T_{tlc} \geq 0.5 \\ 0; & \dfrac{\min(D_{sl}, D_{sh})}{(D_{sl}+D_{sh})} < 0.25 \text{ or } T_{tlc} < 0.5 \end{cases}$$

where $C_s$ is a skill learning range category, 1 represents a learning range, and 0 represents a non-learning range; $D_{sl}$ is a distance from a current state to a lower boundary of the vehicle stability boundary; $D_{sh}$ is a distance from the current state to an upper boundary of the vehicle stability boundary; and $T_{tlc}$ is a time required for front wheels of the vehicle to cross the lane line boundary.

Further, the self-adaptive guided driving right allocation module includes a first-level driving right allocation unit, a self-adaptive learning rate adjustment unit, and a second-level driving right allocation unit, where the first-level driving right allocation unit generates a corresponding allocation coefficient of first-level driving right based on the driving skill classification result;

the second-level driving right allocation unit generates a corresponding allocation coefficient of second-level driving right based on the allocation coefficient of first-level driving right, the skill learning range classification result and a guiding torque obtained by the self-adaptive learning rate adjustment unit, and generates an assisted steering torque based on the allocation coefficient of second-level driving right; and a process of obtaining the guiding torque by the self-adaptive learning rate adjustment unit includes:

correcting an artificial potential field function coefficient based on an assisted consistency ratio between a driver's hand torque and the assisted steering torque, and adjusting an assisted desired trajectory to generate the guiding torque.

Further, a formula for calculating the allocation coefficient of first-level driving right is expressed as:

$$\xi_{1o} = \begin{cases} 0; & \frac{\min(D_{sl}, D_{sh})}{(D_{sl} + D_{sh})} \geq 0.05 \\ 20*\left(0.05 - \frac{\min(D_{sl}, D_{sh})}{(D_{sl} + D_{sh})}\right); & \frac{\min(D_{sl}, D_{sh})}{(D_{sl} + D_{sh})} < 0.05 \end{cases}$$

$$\xi_{1n} = 2*\left(0.5 - \frac{\min(D_{sl}, D_{sh})}{(D_{sl} + D_{sh})}\right)$$

where $\xi_{1o}$ is an allocation coefficient of first-level driving right of an experienced driver; $\xi_{1n}$ is an allocation coefficient of first-level driving right of a novice driver; $D_{sl}$ is the distance from the current state to the lower boundary of the vehicle stability boundary; and $D_{sh}$ is the distance from the current state to the upper boundary of the vehicle stability boundary.

Further, the correcting an artificial potential field function coefficient is specifically as follows: if the assisted consistency ratio is greater than 80%, an correction coefficient of artificial potential field function is reduced by 0.1.

Further, a formula for calculating the allocation coefficient of second-level driving right is expressed as:

$$\xi_o = \xi_{1o} * \xi_{2o}$$

$$\xi_n = \xi_{1n} * \xi_{2n}$$

where $\xi_o$ is an allocation coefficient of second-level driving right of an experienced driver; $\xi_n$ is an allocation coefficient of second-level driving right of a novice driver; $\xi_{1o}$ is an allocation coefficient of first-level driving right of an experienced driver; $\xi_{1n}$ is an allocation coefficient of first-level driving right of a novice driver; $\xi_{2o}$ is a learning driving right allocation coefficient of an experienced driver; and $\xi_{2n}$ is a learning driving right allocation coefficient of a novice driver.

Further, a formula for calculating the learning driving right allocation coefficient is expressed as:

$$\xi_{2o} = 1$$

$$\xi_{2n} = \begin{cases} 1; & C_s = 0 \\ 4*\left(0.25 - \frac{\min(D_{sl}, D_{sh})}{(D_{sl} + D_{sh})}\right); & C_s = 1 \end{cases}$$

where $C_s$ is a skill learning range category, 1 represents a learning range, and 0 represents a non-learning range; $D_{sl}$ is a distance from a current state to a lower boundary of the vehicle stability boundary; and $D_{sh}$ is a distance from the current state to an upper boundary of the vehicle stability boundary.

Compared with the prior art, the present disclosure has the following beneficial effects:

1. According to the present disclosure, allocation control of driving rights of an ADAS is performed through classification of driving skills and classification of skill learning ranges, and driving skills of novice drivers are improved as soon as possible while a use degree of the ADAS by the novice drivers is improved.
2. According to the present disclosure, the driving skills are classified with a vehicle stability margin and a driver state as driving skill characteristics. In terms of the vehicle stability margin and the driver state (such as collected physiological information), similar drivers can have the same vehicle stability margin distribution in driving scenarios with different complexities, accurate driving skill classification can be achieved by means of fewer daily driving scenarios, it is convenient to perform classification model training, and the classification accuracy is high.
3. According to the present disclosure, during the allocation control of the driving rights, both the classification of the driving skills and the classification of the skill learning ranges are considered, and self-adaptive learning rate adjustment is realized based on an assisted consistency ratio, so as to realize the objective of adjusting a skill learning intensity based on a difference between learning abilities of different novice drivers and a difference between learning abilities of the same novice driver in different skill stages, and further improve the reliability.

DETAILED DESCRIPTION OF THE EMBODIMENTS

The present disclosure will be described in detail below with reference to the accompanying drawings and specific embodiments. The embodiments are implemented on the premise of the technical solutions of the present disclosure. The following presents detailed implementations and specific operation processes. The protection scope of the present disclosure, however, is not limited to the following embodiments.

In Learner Driver Experience and Teenagers' Crash Risk during the First Year of Independent Driving, it is pointed out that the learning of driving skills is related to personal characteristics, and too much intervention and high-intensity intervention may cause a driver to turn off an ADAS. Against the problem that inconsistent driving skills of different drivers lead to inconsistent requirements for an assisted intensity of assisted driving, and novice drivers rely too much on an ADAS, so that their driving skills cannot be improved and they cannot cope with dangerous working conditions that are not covered by the ADAS, the present disclosure provides a self-adaptive guided ADAS considering a driving skill difference between drivers to cope with a difference between learning abilities of different drivers and a difference between learning abilities of the same driver in different skill stages, aiming to improve the driving skills as soon as possible under safe conditions.

Figure 1:
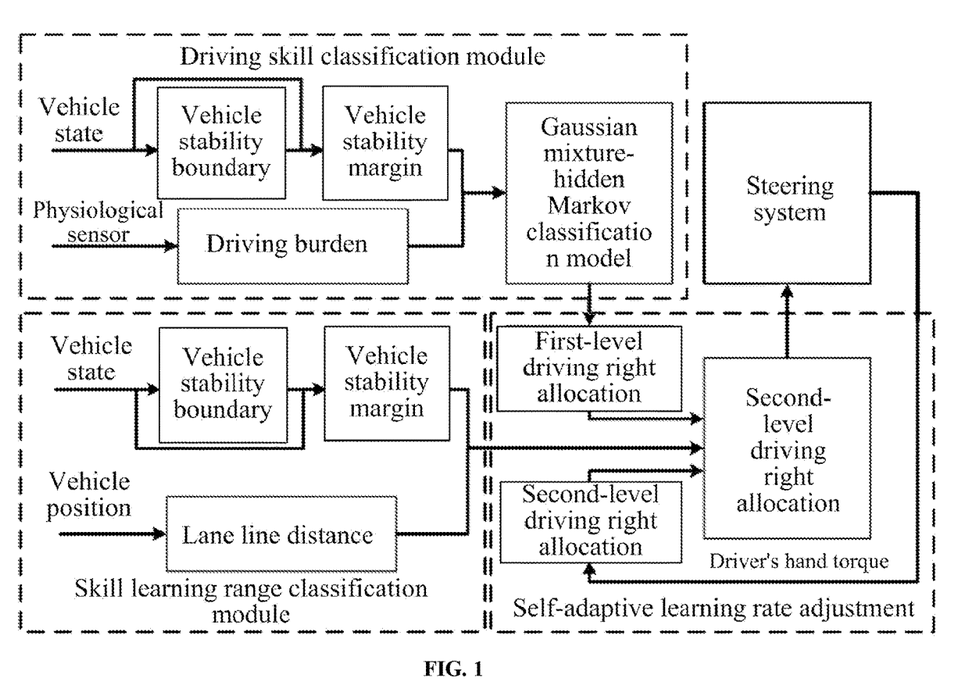
FIG. 1 is a schematic diagram of a system architecture according to the present disclosure.

As shown in FIG. 1, the self-adaptive guided ADAS considering a driving skill difference between drivers according to this embodiment includes a driving skill classification module, a skill learning range classification module, and a self-adaptive guided driving right allocation module. The driving skill classification module is configured to obtain a vehicle state and a driver state, calculate a vehicle stability margin based on the vehicle state, and obtain a corresponding driving skill classification result with the vehicle stability margin and the driver state as inputs of a driving skill classification model, where the vehicle stability margin is used to map a driver's scenario awareness ability and vehicle control ability, and is calculated based on a vehicle stability boundary determined off-line, and the driver state is used to map a driving burden. The driving skill classification module is configured to solve the problem that novice drivers and experienced drivers have different requirements for the ADAS, so as to improve the utilization of the ADAS. The skill learning range classification module is configured to obtain the vehicle stability margin and a distance between a vehicle and a lane line boundary, and use a skill learning range classification model to obtain a skill learning range classification result, aiming to provide a space for drivers to learn skills while vehicle safety is ensured. The self-adaptive guided driving right allocation module is configured to realize driving right allocation control based on the driving skill classification result and the skill learning range classification result, and generate an assisted steering torque acting on a vehicle steering system, to achieve the objective of changing a vehicle pose by means of a change in a motor torque to ensure vehicle safety and guide the driving skill learning. The above system can realize the self-adaptive learning intensity adjustment based on a difference between learning abilities of different drivers and a difference between learning abilities of the same driver in different skill stages.

1. Classification of Driving Skills

Figure 2:
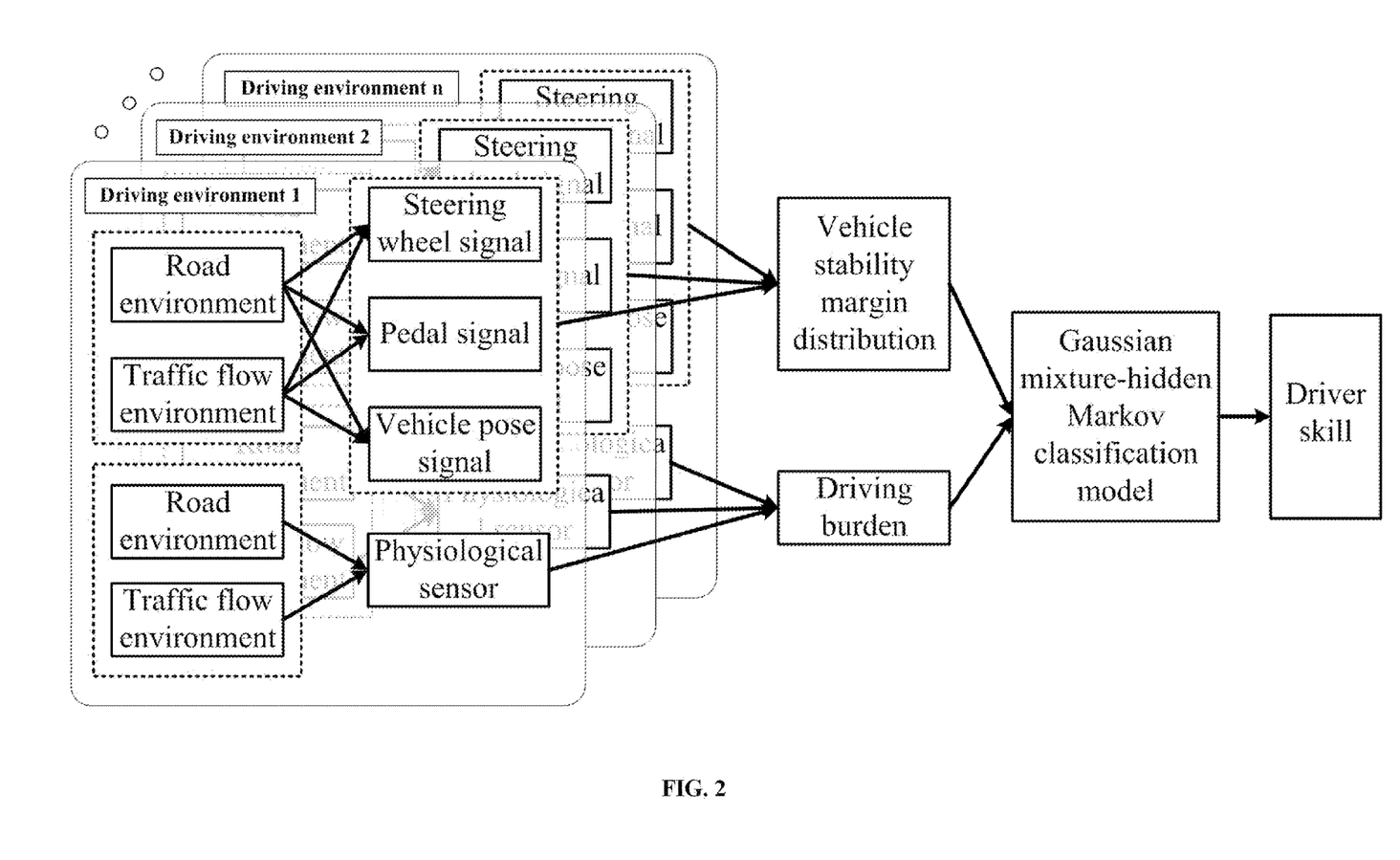
FIG. 2 is a schematic diagram of a working principle of a driving skill classification module according to the present disclosure.

Driving skills are manifested in three aspects: understanding of a driving scenario, control of a vehicle, and an ability to deal with an emergency task. The understanding of a driving scenario reflects a decision of a driving behavior by means of situation awareness, such as a speed and a deceleration point during entry into a bend. This is a main cause of a driving accident. However, in an open environment, it is impossible to enumerate all traffic scenarios (including a vehicle speed, a bend radian, a road condition, and the like). Similarly, evaluation of an ability to control a vehicle and an ability to deal with an emergency task also depends on scenarios, which is thus also faced with the problem that driving scenarios cannot be exhaustive. Therefore, according to the present disclosure, two evaluation indexes, that is, vehicle stability margin distribution and a driving burden during driving, are used as inputs of a driving skill classification model, and finally the driving skills are classified by means of a Gaussian mixture-hidden Markov classification model. An architecture of the driving skill classification module is shown in FIG. 2, and has the advantage of accurate driving skill classification by means of fewer daily driving scenarios.

1) Acquisition of Stable Margin Distribution

Figure 3:
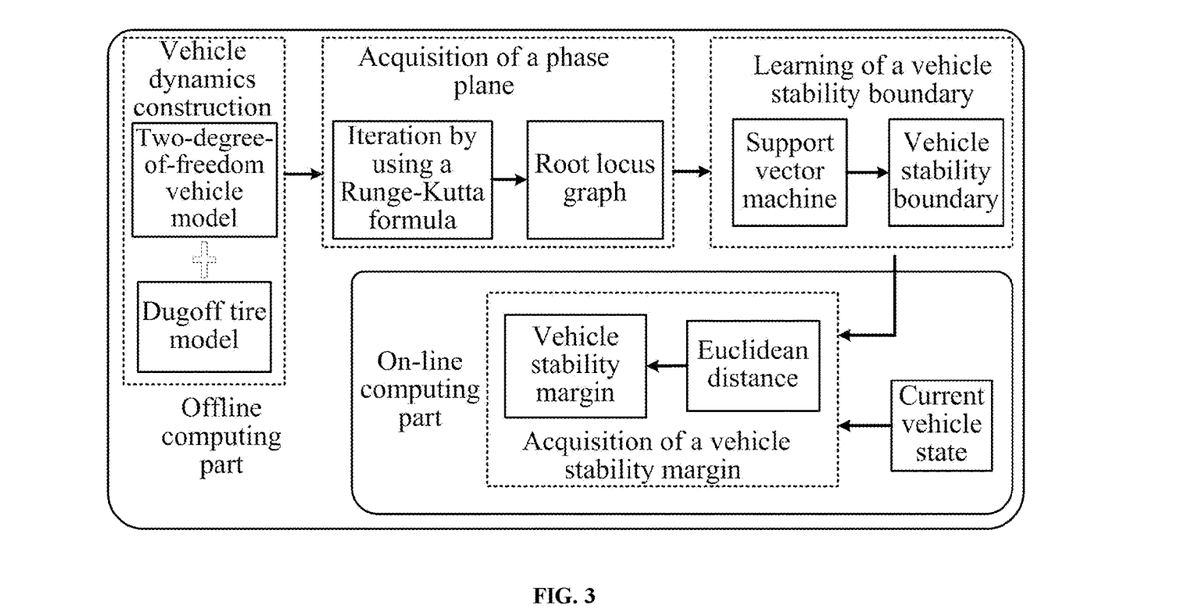
FIG. 3 is a diagram showing a principle of obtaining a vehicle stability boundary based on a support vector machine according to the present disclosure.

The acquisition of stability margin distribution mainly includes vehicle dynamics construction, acquisition of a root locus graph, learning of a vehicle stability boundary, and acquisition of a vehicle stability margin. The structure is shown in FIG. 3. In the vehicle dynamics construction, a two-degree-of-freedom vehicle model and a Dugoff tire model are used to construct a vehicle dynamics model, and simpler or more complex models may be used according to a capacity of a computing platform, and are not limited thereto. According to the present disclosure, the root locus graph is obtained by iterating each group of states by using a third-order Runge-Kutta formula for 100 times. The state herein includes two parts. The first part is an input amount, which refers to a front wheel angle and a longitudinal vehicle speed; and the second part is an initial state, which refers to a vehicle body mass center side slip angle and a yaw rate of the vehicle. In addition, according to the present disclosure, the vehicle stability boundary is learned by using a support vector machine. A specific method is to determine whether the state belongs to a stable point by determining whether a root locus in this state converges to a closed-loop pole. Finally, the vehicle stability margin is obtained by calculating a minimum Euclidean distance from a current state to a vehicle stability boundary in the current state.

2) Acquisition of a Driving Burden

In this embodiment, physiological information such as a driver's heart rate, skin electrical response and blood flow is obtained by a physiological acquisition system as a driver state, and a driving task burden on the driver is evaluated based on the physiological information. This is a main index that reflects the driver's response to an emergency.

3) Based on the Gaussian Mixture-Hidden Markov Classification Model

The vehicle stability margin and the driving burden obtained above are used as the inputs of the Gaussian mixture-hidden Markov classification model, and a label of the driver who participated in a test is used as a recognized target. When a recognition error of the classification model is stable, model training is stopped and an important coefficient of the classification model is saved. Actual classification is performed by using the trained Gaussian mixture-hidden Markov classification model.

2. Classification of Skill Learning Ranges

The purpose of the classification of driving skill learning ranges is to classify dangerous working conditions and safe working conditions so as to ensure that novice drivers can learn driving skills under the safe working conditions. The classification is performed mainly by means of the vehicle stability margin and a lane line distance. A method of obtaining the vehicle stability margin is the same as a method of obtaining stability margin distribution in driving skill classification, and is not repeated herein. It is pointed out in Automotive Ergonomics that drivers only use 50% of performance of a vehicle at most during normal driving. Therefore, it is defined in the present disclosure that an area with the stability margin accounting for more than 25% of a stability boundary width is defined as a safe area (the stability boundary width is bilaterally symmetrical, so a unidirectional proportion is 50%, otherwise it is a dangerous area. The lane line distance is determined by a time to lane crossing (TLC) required for front wheels of the vehicle to cross the lane line boundary, and a TLC threshold is suggested to be 0.5 s in the Design and experimental research of lane departure ADAS for intelligent vehicles. Therefore, the skill learning range classification model designed in this embodiment is as follows:

$$C_s = \begin{cases} 1; & \frac{\min(D_{sl}, D_{sh})}{(D_{sl} + D_{sh})} \geq 0.25 \text{ and } T_{tlc} \geq 0.5 \\ 0; & \frac{\min(D_{sl}, D_{sh})}{(D_{sl} + D_{sh})} < 0.25 \text{ or } T_{tlc} < 0.5 \end{cases}, \text{ and} \quad (1)$$

$$T_{tlc} = \frac{\frac{D}{2} - L - a \cdot \sin\theta - \frac{d}{2} \cdot \cos\theta}{v_y \cdot \sin\theta}, \quad (2)$$

where $C_s$ is a skill learning range category, 1 represents a learning range, and 0 represents a non-learning range; $D_{sl}$ is a distance from a current state to a lower boundary of the vehicle stability boundary, and is specifically a minimum Euclidean distance; $D_{sh}$ is a distance from the current state to an upper boundary of the vehicle stability boundary; $T_{tlc}$ is a time required for front wheels of the vehicle to cross the lane line boundary; D is a width between lane lines; and a and d are a distance and a wheel base between a vehicle mass center and a front axle, respectively. L is a distance between the vehicle mass center and a lane center line; 0 is a relative course angle of the vehicle; and $v_y$ is a vehicle speed.

3. Self-Adaptive Guided Driving Right Allocation

Figure 4:
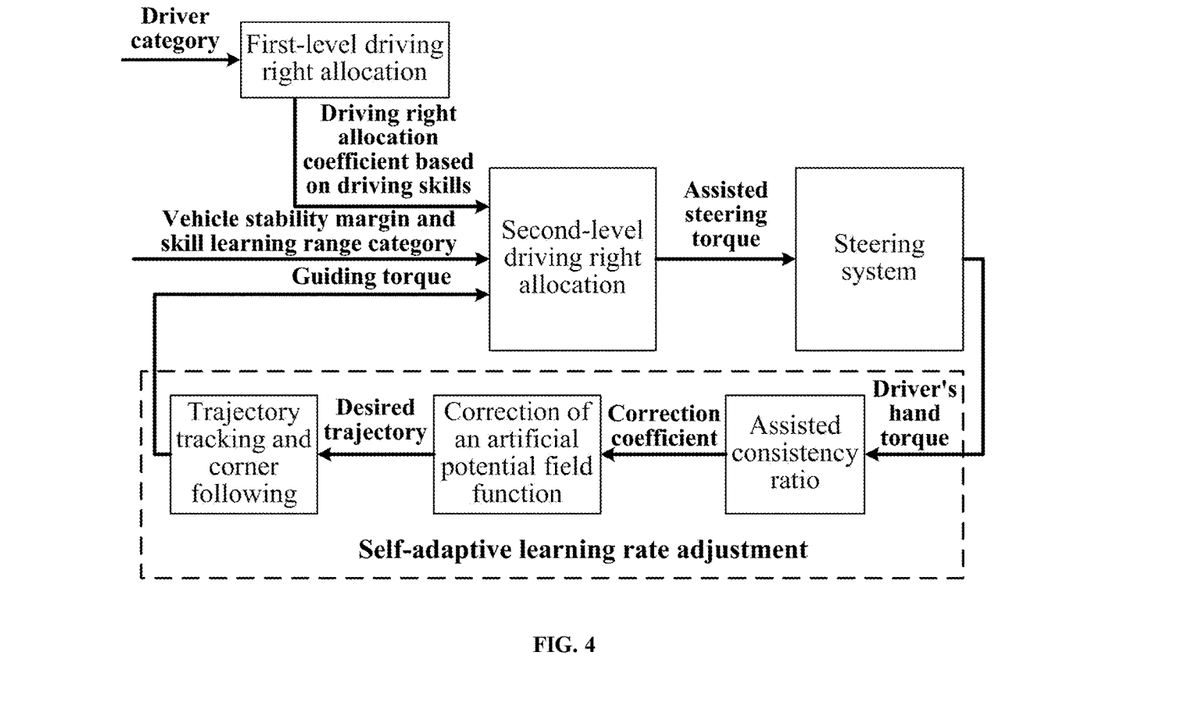
FIG. 4 is a schematic diagram showing a working principle of a self-adaptive guided driving right allocation module according to the present disclosure.

The function of the self-adaptive guided driving right allocation module is to allocate drivers reasonably based on a driver type and a vehicle state and to correct a driving skill learning rate based on a learning ability of drivers. The self-adaptive guided driving right allocation module mainly includes a first-level driving right allocation unit, a self-adaptive learning rate adjustment unit, and a second-level driving right allocation unit, with a structure shown in FIG. 4.

1) First-Level Driving Right Allocation

The first-level driving right allocation is to perform driving right allocation based on a driver's skill level, and is mainly used to meet requirements of different experienced drivers and novice drivers with different assisted intensities. It is believed that experienced drivers can handle 90% or more of daily working conditions (which can be modified based on a specific situation). Therefore, for experienced drivers, the first-level driving right allocation is effective only when an area with the stability margin accounting for less than 5% of the stability boundary width is defined as a safe area, but is effective all the time for novice drivers. Therefore, the first-level driving right allocation is as follows:

$$\xi_{1o} = \begin{cases} 0; & \frac{\min(D_{sl}, D_{sh})}{(D_{sl} + D_{sh})} \geq 0.05 \\ 20 * \left(0.05 - \frac{\min(D_{sl}, D_{sh})}{(D_{sl} + D_{sh})}\right); & \frac{\min(D_{sl}, D_{sh})}{(D_{sl} + D_{sh})} < 0.05 \end{cases}, \text{ and} \quad (3)$$

$$\xi_{1n} = 2 * \left(0.5 - \frac{\min(D_{sl}, D_{sh})}{(D_{sl} + D_{sh})}\right), \quad (4)$$

where $\xi_{1o}$ is an allocation coefficient of first-level driving right of an experienced driver; $\xi_{1n}$ is an allocation coefficient of first-level driving right of a novice driver; $D_{sl}$ is the distance from the current state to the lower boundary of the vehicle stability boundary; and $D_{sh}$ is the distance from the current state to the upper boundary of the vehicle stability boundary.

2) Self-Adaptive Learning Rate Adjustment

The self-adaptive learning rate adjustment aims at realizing skill learning intensity adjustment based on a difference between learning abilities of different novice drivers and a difference between learning abilities of the same novice driver in different skill stages. The self-adaptive learning rate adjustment mainly includes calculation of an assisted consistency ratio, correction of an artificial potential field function, and trajectory tracking and corner following.

a) Calculation of an Assisted Consistency Ratio

The assisted consistency ratio $T_{cr}$ is defined as a time ratio when a direction of a determined assisted steering torque is consistent with a direction of a driver torque in an assisted process, with a calculation formula as follows:

$$t_{cr} = t_{hs}/t_{ass} \quad (5),$$

where $t_{cr}$ is the assisted consistency ratio; $t_{hs}$ is defined as a time when a direction of a determined assisted steering torque is consistent with a direction of a driver torque in an assisted process; and $t_{ass}$ is a total time when a secondary ADAS is effective.

b) Correction of an Artificial Potential Field Function

This is to correct a trajectory planned by the ADAS based on the assisted consistency ratio, which is realized by correcting the artificial potential field function. Experienced drivers have the best obstacle avoidance trajectory and cornering trajectory because they have more accurate perception of a distance and a speed. A repulsion function of objects and road lane lines can be obtained from experienced drivers by learning of big data, and is used as a target repulsion function herein. However, novice drivers adopt a more conservative repulsion function because of their inaccurate perception of a distance and a speed, which is referred to as a learning repulsion function (that is, a multiple of the target repulsion function with an initial value of 2). According to the present disclosure, a correction coefficient of artificial potential field function is determined by using the assisted consistency ratio, and when the correction coefficient is 1, that is, when the learning repulsion function is consistent with the target repulsion function, it can be believed that the driving skill learning is completed. The adjustment of stage learning is realized by reducing the correction coefficient of artificial potential field function by 0.1 if the assisted consistency ratio is greater than 80%. Therefore, formulas for calculating the learning repulsion function are as follows:

$$U_{n\_lane} = k_l * U_{o\_lane} \quad st: k_l = \begin{cases} k_l; & T_{cr} < 0.8 \text{ or } k_l = 1 \\ k_l - 0.1; & T_{cr} \geq 0.8 \text{ and } k_l > 1 \end{cases}, \text{ and} \quad (6)$$

$$U_{n\_obs} = k_{obs} * U_{o\_obs} \quad st: k_{obs} = \begin{cases} k_{obs}; & T_{cr} < 0.8 \text{ or } k_l = 1 \\ k_{obs} - 0.1; & T_{cr} \geq 0.8 \text{ and } k_{obs} > 1 \end{cases}, \quad (7)$$

where $T_{cr}$ is the assisted consistency ratio; $U_{n\_lane}$ is a learning road repulsion function; $U_{o\_lane}$ is a target road repulsion function, and is obtained by learning of big data; $k_l$ is a road repulsion function correction coefficient; $U_{n\_obs}$ is a learning obstacle repulsion function; $U_{o\_obs}$ is a target obstacle repulsion function, and is obtained by learning of big data; and $k_{obs}$ is an obstacle repulsion function correction coefficient.

c) Trajectory Tracking and Corner Following

This functions to determine a driving behavior (steering wheel angle and acceleration) needed to track a desired trajectory and a guiding torque needed to follow a desired steering wheel angle. The driving behavior can be obtained by predictive control of a model, and the guiding torque can be obtained by three-closed-loop position following control of a motor, and methods are not limited thereto.

3) Second-Level Driving Right Allocation

The function of this part is divided into learning driving right allocation and determining of an ADAS torque. The learning driving right allocation is to superimpose a skill learning part on the basis of the first-level driving right allocation, so as to realize the connection between skill learning and risk avoidance of the assisted driving function. The ADAS torque is determined to be a motor control torque finally output by the self-adaptive guided ADAS. The vehicle pose is changed by means of a change in the motor torque to ensure vehicle safety and guide driving skill learning.

a) Learning Driving Right Allocation

The learning driving right allocation is to perform driving right allocation based on the vehicle stability margin and a skill learning range category, aiming at providing novice drivers with varying degrees of learning space based on the vehicle stability margin while the safety is ensured. The vehicle stability margin should be inversely proportional to the assisted intensity, and experienced drivers want to be assisted at this time. Therefore, the learning driving right allocation is as follows:

$$\xi_{2o} = 1, \text{ and} \quad (8)$$

$$\xi_{2n} = \begin{cases} 1; & C_s = 0 \\ 4*\left(0.25 - \frac{\min(D_{sl}, D_{sh})}{(D_{sl} + D_{sh})}\right); & C_s = 1 \end{cases}, \quad (9)$$

where $\xi_{2o}$ is a learning driving right allocation coefficient of an experienced driver; $\xi_{2n}$ is a learning driving right allocation coefficient of a novice driver; $C_s$ is the skill learning range category, 1 represents a learning range, and 0 represents a non-learning range.

b) Determining of an ADAS Torque

Second-level driving right allocation can be achieved by superposition of the learning driving right allocation and the first-level driving right allocation. The second-level driving right allocation is a proportion of final permissions of the ADAS to control the vehicle state (1 represents complete control by the ADAS, and 0 represents complete control by a driver), which is achieved by determining a steering motor torque. Since the assisted intensity is directly proportional to the assisted steering torque, formulas for calculating the assisted steering torque are as follows:

$$T_{o\_ass} = \xi_o * T_{sw} = \xi_{1o} * \xi_{2o} * T_{sw} \quad (10), \text{ and}$$

$$T_{n\_ass} = \xi_n * T_{sw} = \xi_{1n} * \xi_{2n} * T_{sw} \quad (11),$$

where $T_{o\_ass}$ is an assisted steering torque of an experienced driver; $\xi_o$ is an allocation coefficient of second-level driving right of an experienced driver; $T_{n\_ass}$ is an assisted steering torque of a novice driver; $\xi_n$ is an allocation coefficient of second-level driving right of a novice driver; $T_{sw}$ is a desired corner following torque, and is obtained by three-closed-loop position following control of the motor; $\xi_{1o}$ is an allocation coefficient of first-level driving right of an experienced driver; $\xi_{1n}$ is an allocation coefficient of first-level driving right of a novice driver; $\xi_{2o}$ is a learning driving right allocation coefficient of an experienced driver; and $\xi_{2n}$ is a learning driving right allocation coefficient of a novice driver.

An overall working process of the above self-adaptive guided ADAS considering a driving skill difference between drivers includes the following steps.

1): Change a parameter in a vehicle dynamic model based on a vehicle that needs to be equipped with an ADAS, and then obtain a root locus graph of a yaw rate and a mass center side slip angle by iteration by using a third-order Runge-Kutta formula, with a front wheel angle and a longitudinal vehicle speed as inputs.

2): Classify roots in the root locus graph by using a support vector machine to obtain a classification hyperplane, that is, a vehicle stability boundary; then obtain a vehicle stability margin in real time by calculating a minimum Euclidean distance from a current state to the vehicle stability boundary in the current state; and obtain physiological information such as a driver's heart rate, skin electrical response, and blood flow by a physiological acquisition system.

3): Set a 5-second data observation window, and input vehicle stability margin data and physiological data within a time window as a Gaussian mixture-hidden Markov model to train a driving skill classification model. Finally, the driving skill classification model outputs a driver's skill level and provides a basis for driving right allocation.

4): Perform, by a skill learning range classification model, by means of the stability margin and a TLC required for front wheels of the vehicle to cross a lane line boundary. An area with the stability margin accounting for more than 25% of a stability boundary width and with the TLC greater than 0.5 s is defined as a safe area, otherwise it is a dangerous area. The skill learning range classification model finally outputs a vehicle state category, that is, a skill learning range classification category, which provides a basis for driving right allocation.

5): Calculate an assisted consistency ratio, which is a time ratio when a direction of a determined assisted steering torque is consistent with a direction of a driver torque, which provides a basis for correcting an artificial potential field function.

6): Correct the artificial potential field function by using the assisted consistency ratio calculated in step 5), and graded learning of driving skills is achieved by adjusting a desired trajectory. It is defined herein that if the assisted consistency ratio is greater than 80%, the correction coefficient of artificial potential field function is reduced by 0.1, that is, a driving skill learned is improved by one level (one driving skill is divided into 10 levels).

7): Obtain a driving behavior (steering wheel angle and acceleration) following the desired trajectory by predictive control of a model, and then obtain a guiding torque required to follow a desired steering wheel angle by three-closed-loop position following control of a motor.

8): Perform driving right allocation by means of the driving skill category obtained in step 3) and the vehicle state category obtained in step 4). First-level driving right allocation is to perform driving right allocation based on a driver's skill level. For experienced drivers, the first-level driving right allocation is effective only when the stability margin accounts for less than 5% of the stability boundary width, but is effective all the time for novice drivers.

Learning driving right allocation is to perform driving right allocation based on the vehicle stability margin and the skill learning range category. Only when the skill learning range category is a safety range, can the ADAS have driving rights, and the vehicle stability margin should be inversely proportional to the assisted intensity, that is, the driving rights should be inversely proportional to the vehicle stability margin.

9): Obtain second-level driving right allocation by multiplying the first-level driving right allocation with the learning driving right allocation, so as to realize the connection between skill learning and risk avoidance of the assisted driving function.

10): Obtain a final assisted steering torque by means of an allocation coefficient of second-level driving right obtained in step 9) and the guiding torque obtained in step 7), to change a vehicle pose by means of a change in a motor torque to ensure vehicle safety and guide driving skill learning.

The foregoing is detailed description of the preferred specific embodiments of the present disclosure. It should be understood that a person of ordinary skill in the art can make various modifications and variations according to the concept of the present disclosure without creative efforts. Therefore, all technical solutions that a person skilled in the art can obtain based on the prior art through logical analysis, reasoning, or finite experiments according to the concept of the present disclosure shall fall within the protection scope determined by the claims.

What is claimed is:

1. A self-adaptive guided advanced driver assistance system (ADAS) considering a driving skill difference between drivers, comprising:
    a driving skill classification module, configured to obtain a vehicle state and a driver state, calculate a vehicle stability margin based on the vehicle state, and obtain a corresponding driving skill classification result with the vehicle stability margin and the driver state as inputs of a driving skill classification model, wherein the vehicle stability margin is calculated based on a vehicle stability boundary determined off-line;
    a skill learning range classification module, configured to obtain the vehicle stability margin and a distance between a vehicle and a lane line boundary, and use a skill learning range classification model to obtain a skill learning range classification result; and
    a self-adaptive guided driving right allocation module, configured to realize driving right allocation control based on the driving skill classification result and the skill learning range classification result, and generate an assisted steering torque acting on a vehicle steering system.

2. The self-adaptive guided ADAS considering a driving skill difference between drivers according to claim 1, wherein a process for determining the vehicle stability boundary specifically comprises:
    constructing a vehicle dynamics model;
    obtaining a root locus graph of a vehicle state change based on the vehicle dynamics model; and
    performing classified training on state points in the root locus graph by a support vector machine to obtain a classification hyperplane, wherein the classification hyperplane is used as the vehicle stability boundary.

3. The self-adaptive guided ADAS considering a driving skill difference between drivers according to claim 2, wherein the vehicle dynamics model is a two-degree-of-freedom vehicle model and a Dugoff tire model.

4. The self-adaptive guided ADAS considering a driving skill difference between drivers according to claim 2, wherein each group of states is iterated by using a third-order Runge-Kutta formula to obtain the root locus graph.

5. The self-adaptive guided ADAS considering a driving skill difference between drivers according to claim 1, wherein the skill learning range classification model is expressed as:

$$C_s = \begin{cases} 1; & \frac{\min(D_{sl}, D_{sh})}{(D_{sl} + D_{sh})} \geq 0.25 \text{ and } T_{tlc} \geq 0.5 \\ 0; & \frac{\min(D_{sl}, D_{sh})}{(D_{sl} + D_{sh})} < 0.25 \text{ or } T_{tlc} < 0.5 \end{cases}$$

wherein $C_s$ is a skill learning range category, 1 represents a learning range, and 0 represents a non-learning range; $D_{sl}$ is a distance from a current state to a lower boundary of the vehicle stability boundary; $D_{sh}$ is a distance from the current state to an upper boundary of the vehicle stability boundary; and $T_{tlc}$ is a time required for front wheels of the vehicle to cross the lane line boundary.

6. The self-adaptive guided ADAS considering a driving skill difference between drivers according to claim 1, wherein the self-adaptive guided driving right allocation module comprises a first-level driving right allocation unit, a self-adaptive learning rate adjustment unit, and a second-level driving right allocation unit, wherein
    the first-level driving right allocation unit generates a corresponding allocation coefficient of first-level driving right based on the driving skill classification result;
    the second-level driving right allocation unit generates a corresponding allocation coefficient of second-level driving right based on the allocation coefficient of first-level driving right, the skill learning range classification result and a guiding torque obtained by the self-adaptive learning rate adjustment unit, and generates an assisted steering torque based on the allocation coefficient of second-level driving right; and
    a process of obtaining the guiding torque by the self-adaptive learning rate adjustment unit comprises:
    correcting an artificial potential field function coefficient based on an assisted consistency ratio between a driver's hand torque and the assisted steering torque, and adjusting an assisted desired trajectory to generate the guiding torque.

7. The self-adaptive guided ADAS considering a driving skill difference between drivers according to claim 6, wherein a formula for calculating the allocation coefficient of first-level driving right is expressed as:

$$\xi_{1o} = \begin{cases} 0; & \frac{\min(D_{sl}, D_{sh})}{(D_{sl} + D_{sh})} \geq 0.05 \\ 20 * \left(0.05 - \frac{\min(D_{sl}, D_{sh})}{(D_{sl} + D_{sh})}\right); & \frac{\min(D_{sl}, D_{sh})}{(D_{sl} + D_{sh})} < 0.05 \end{cases}$$

$$\xi_{1n} = 2 * \left(0.5 - \frac{\min(D_{sl}, D_{sh})}{(D_{sl} + D_{sh})}\right)$$

wherein $\xi_{1o}$ is an allocation coefficient of first-level driving right of an experienced driver; $\xi_{1n}$ is an allocation coefficient of first-level driving right of a novice driver; $D_{sl}$ is the distance from the current state to the lower boundary of the vehicle stability boundary; and $D_{sh}$ is the distance from the current state to the upper boundary of the vehicle stability boundary.

8. The self-adaptive guided ADAS considering a driving skill difference between drivers according to claim 6, wherein the correcting an artificial potential field function coefficient is specifically as follows: if the assisted consistency ratio is greater than 80%, an correction coefficient of artificial potential field function is reduced by 0.1.

9. The self-adaptive guided ADAS considering a driving skill difference between drivers according to claim 6, wherein a formula for calculating the allocation coefficient of second-level driving right is expressed as:

$$\xi_o = \xi_{1o} * \xi_{2o}$$

$$\xi_n = \xi_{1n} * \xi_{2n}$$

wherein $\xi_o$ is an allocation coefficient of second-level driving right of an experienced driver; $\xi_n$ is an allocation coefficient of second-level driving right of a novice driver; $\xi_{1o}$ is an allocation coefficient of first-level driving right of an experienced driver; $\xi_{1n}$ is an allocation coefficient of first-level driving right of a novice driver; $\xi_{2o}$ is a learning driving right allocation coefficient of an experienced driver; and $\xi_{2n}$ is a learning driving right allocation coefficient of a novice driver.

10. The self-adaptive guided ADAS considering a driving skill difference between drivers according to claim 9, wherein a formula for calculating the learning driving right allocation coefficient is expressed as:

$$\xi_{2o} = 1$$

$$\xi_{2n} = \begin{cases} 1; & C_s = 0 \\ 4 * \left(0.25 - \dfrac{\min(D_{sl}, D_{sh})}{(D_{sl} + D_{sh})}\right); & C_s = 1 \end{cases}$$

wherein $C_s$ is a skill learning range category, 1 represents a learning range, and 0 represents a non-learning range; $D_{sl}$ is a distance from a current state to a lower boundary of the vehicle stability boundary; and $D_{sh}$ is a distance from the current state to an upper boundary of the vehicle stability boundary.

* * * * *